(12) United States Patent
Sacco et al.

(10) Patent No.: US 12,145,761 B2
(45) Date of Patent: Nov. 19, 2024

(54) PACKAGING LINE

(71) Applicant: SPS ITALIANA PACK SYSTEMS S.P.A., Torrebelvicino (IT)

(72) Inventors: Alberto Sacco, Bogogno (IT); Massimo Rossi, Arona (IT)

(73) Assignee: SPS ITALIANA PACK SYSTEMS S.P.A., Torrebelvicino (Vicenza) (IT)

( * ) Notice: Subject to any disclaimer, the term of this patent is extended or adjusted under 35 U.S.C. 154(b) by 189 days.

(21) Appl. No.: 17/784,477

(22) PCT Filed: Dec. 9, 2020

(86) PCT No.: PCT/IB2020/061672
§ 371 (c)(1),
(2) Date: Jun. 10, 2022

(87) PCT Pub. No.: WO2021/116924
PCT Pub. Date: Jun. 17, 2021

(65) Prior Publication Data
US 2023/0035824 A1 Feb. 2, 2023

(30) Foreign Application Priority Data
Dec. 10, 2019 (IT) .......................... 102019000023463

(51) Int. Cl.
*B65B 65/00* (2006.01)
*B65B 23/14* (2006.01)
(Continued)

(52) U.S. Cl.
CPC ............ *B65B 65/006* (2013.01); *B65B 23/14* (2013.01); *B65B 35/10* (2013.01); *B65G 47/32* (2013.01);
(Continued)

(58) Field of Classification Search
CPC ....... B65B 35/44; B65B 65/006; B65B 23/14; B65B 35/10; B65B 2210/02; B65G 47/32;
(Continued)

(56) References Cited

U.S. PATENT DOCUMENTS 3,429,416 A * 2/1969 Provost ................ B65G 47/681
198/463.3
5,287,952 A * 2/1994 Redaelli ............... B65G 47/647
198/448

(Continued)

FOREIGN PATENT DOCUMENTS

CN 104603012 B * 10/2016 ............ B65B 35/24
EP 1123886 A1 8/2001
(Continued)

OTHER PUBLICATIONS

Written Opinion and International Search Report for PCT Patent Application No. PCT/IB2020/061672, mailed Feb. 18, 2021, Rijswijk, NL, 9 pages.

*Primary Examiner* — James R Bidwell
(74) *Attorney, Agent, or Firm* — MCANDREWS HELD & MALLOY, LTD

(57) ABSTRACT

A packaging line for products, in particular food products, includes a conveyor belt having a longitudinal feed axis and carrying the products arranged in a plurality of rows orthogonal to the longitudinal feed axis, at least one packaging machine for the products, and at least one transfer device for transferring the products from the conveyor belt to the at least one packaging machine along a direction transverse to the longitudinal feed axis. The at least one transfer device has a linear motor having a closed-loop stator and a plurality of conveyor units independently movable along the closed-loop stator, each configured to receive at least one of the products.

11 Claims, 6 Drawing Sheets

(51) Int. Cl.
    *B65B 35/10*     (2006.01)
    *B65G 47/32*     (2006.01)

(52) U.S. Cl.
    CPC .. *B65B 2210/02* (2013.01); *B65G 2201/0205* (2013.01)

(58) Field of Classification Search
    CPC . B65G 47/57; B65G 47/53; B65G 2201/0205
    USPC ........................................................ 198/433
    See application file for complete search history.

(56) References Cited

U.S. PATENT DOCUMENTS

| | | | | |
|---|---|---|---|---|
| 5,640,833 | A * | 6/1997 | Gerber | B65G 47/647 |
| | | | | 53/251 |
| 5,653,328 | A * | 8/1997 | Pedrotto | B65G 47/082 |
| | | | | 198/418.6 |
| 6,543,989 | B1 | 4/2003 | Derenthal et al. | |
| 8,104,602 | B2 * | 1/2012 | Sirocchi | B65G 47/082 |
| | | | | 198/433 |
| 8,646,248 | B2 * | 2/2014 | Iwasa | B65B 5/06 |
| | | | | 53/244 |
| 2019/0100387 | A1 * | 4/2019 | Hayashi | B65G 47/32 |

FOREIGN PATENT DOCUMENTS

| | | | |
|---|---|---|---|
| EP | 2746165 | A1 | 6/2014 |
| WO | 2016012229 | A2 | 1/2016 |

\* cited by examiner

PACKAGING LINE

CROSS-REFERENCE TO RELATED APPLICATIONS

This application is a National Phase Application of International Patent Application No. PCT/IB2020/061672, filed Dec. 9, 2020, which claims benefit of Italian Patent Application No. 102019000023463 filed to the Italy Patent Office on Dec. 10, 2019, entitled "PACKAGING LINE", contents of both of which are hereby incorporated by reference in their entirety.

FIELD OF THE INVENTION

This invention refers to a packaging line for products, in particular food products such as biscuits.

More specifically, such a line comprises:
- a conveyor belt having a longitudinal feed axis and carrying said products arranged in a plurality of rows substantially orthogonal to said longitudinal axis,
- at least one packaging machine, and
- at least one device to transfer said products from the conveyor belt to said at least one packaging machine along a direction transverse to said longitudinal axis.

BACKGROUND OF THE INVENTION

EP 1 123 886 A1 describes a packaging line of the type indicated above, wherein the at least one transfer device comprises a linear motor including a closed-loop stator and a plurality of conveyor units independently movable along the stator and each adapted to receive at least one of the products and to transport it to the at least one packaging machine.

SUMMARY OF THE INVENTION

An object of this invention is to provide an improved line with respect to the known ones, and in particular one that is more versatile and capable of packaging more products per unit of time.

According to the present invention, this object is achieved by a packaging line having the features indicated in claim 1 hereinafter as described and claimed herein.

In particular, the use of a transfer device wherein the individual conveyor units are movable independently of each other allows the transfer of the products to the packaging machine to be adapted to the ways in which they are fed by the conveyor belt each time, avoiding dead times and fully exploiting the potential of the individual components of the line. Furthermore, the possibility of inclining the portion of the conveyor belt located upstream of the transfer device forward in such a way whereby one of the free ends thereof is lowered and positioned adjacent to the transfer device facilitates the passage of products from the conveyor belt to the transfer device. The use of an actuator member having a sliding stem, the distal end of which is articulated to an arm that extends from a fixed end of the inclinable portion, allows the movement of the inclinable portion to be safely and precisely controlled, ensuring high productivity.

A further object of this invention is a product packaging method which provides for the use of the aforementioned packaging line.

BRIEF DESCRIPTION OF THE FIGURES

Further advantages and features of this invention will be evident from the following detailed description, provided by way of non-limiting example with reference to the accompanying drawings, wherein.

DETAILED DESCRIPTION

Figure 1:
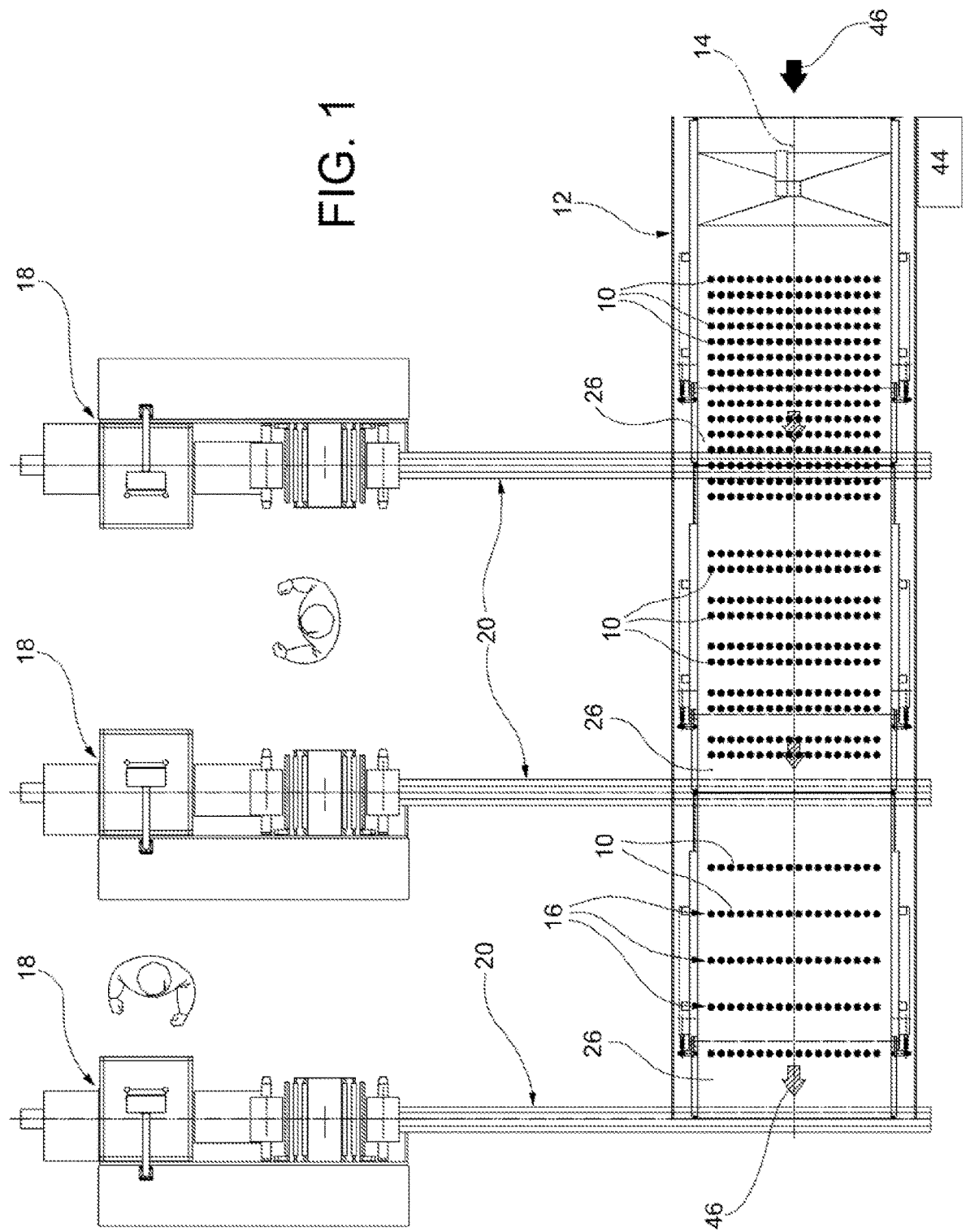
FIG. 1 is a schematic plan view of a packaging line of the invention.

A packaging line for products 10, in particular food products such as biscuits, comprises a conveyor belt 12 having a longitudinal feed axis 14 and carrying the products 10 arranged in a plurality of rows 16 substantially orthogonal with respect to the longitudinal feed axis 14.

The packaging line further comprises a plurality of packaging machines 18 for the products 10, known per se and arranged longitudinally offset with respect to the conveyor belt 12. Each packaging machine 18 is associated with a corresponding device 20 for transferring the products 10 coming from the conveyor belt 12 along a transverse, and in particular substantially orthogonal, direction with respect to the longitudinal axis 14.

Figure 2:
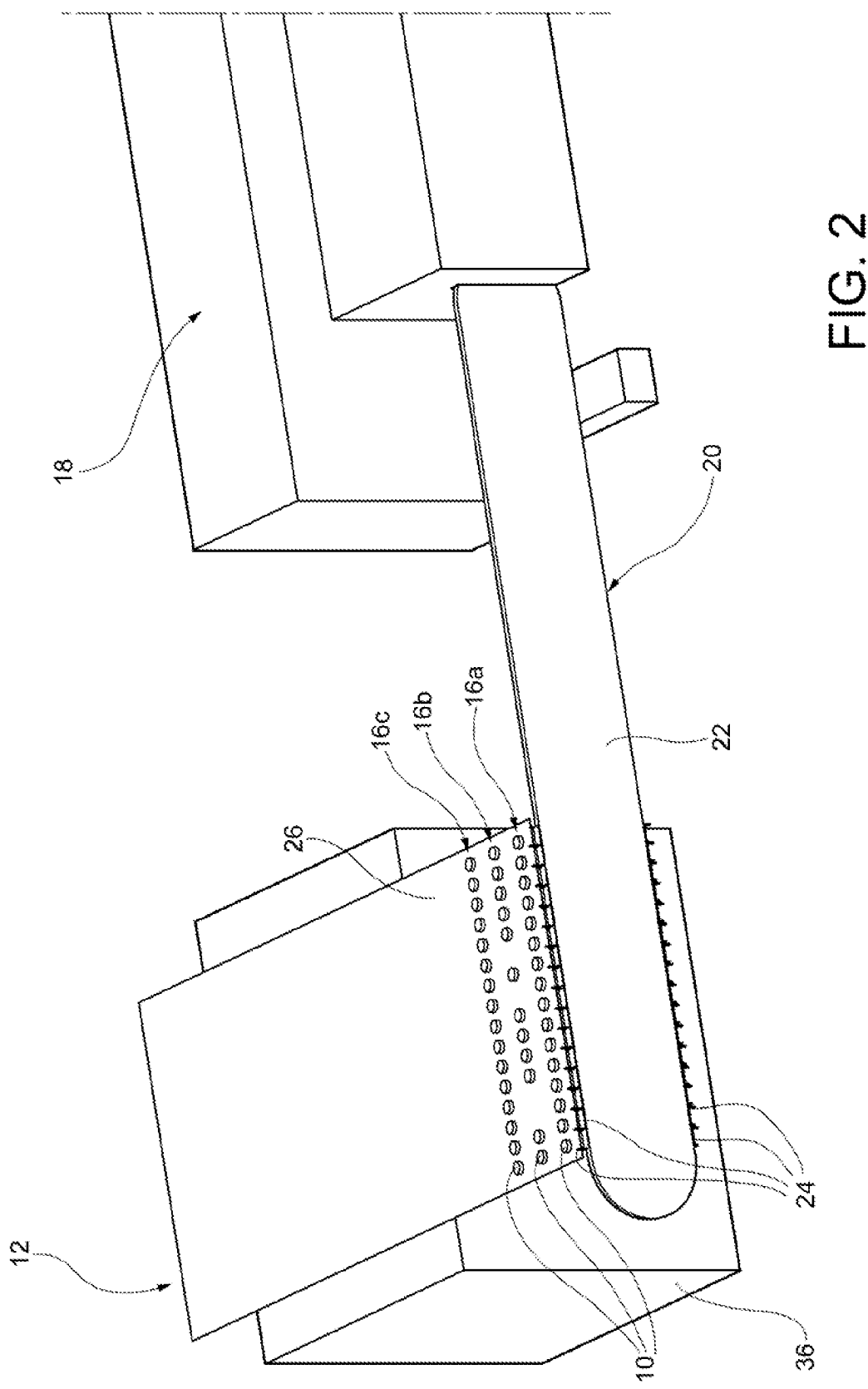
FIG. 2 is a schematic perspective view of a portion including a belt portion, a transfer device and a packaging machine of the packaging line of FIG. 1, FIGS. 3 to 5 are schematic perspective views of successive stages of operation of components of the packaging line of the invention illustrated in FIG. 2.

Each transfer device 20 comprises (FIG. 2) a linear electric motor including a closed-loop stator 22 and a plurality of conveyor units 24 autonomously movable along the stator 22 and each adapted to carry one of the products 10. In particular, the stator 22 comprises two rectilinear lengths parallel to each other in a vertical plane and joined at the ends by two semicircular portions.

Figure 7:
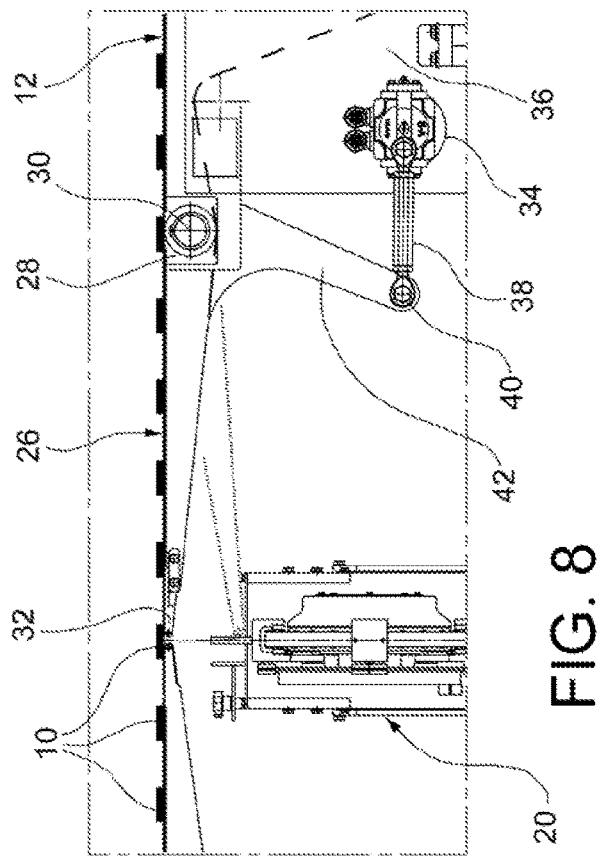
Figure 8:
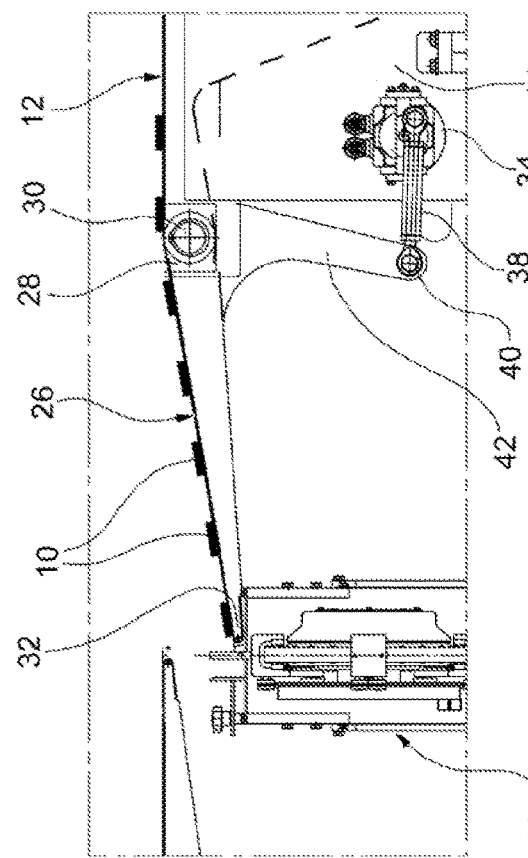

The conveyor belt 12 comprises, immediately upstream of the intersection with each transfer device 20, a portion 26 provided with means which allow its selective forward inclination. Consequently, the portion 26 may be inclined forward (FIG. 7) or kept flush with the adjacent portions of the conveyor belt 12 (FIG. 8), according to the operational requirements.

Each inclinable portion 26 has an end 28 pivoted about a transverse axis 30 substantially orthogonal to the longitudinal axis 14 and an opposite end 32 which, in a non-inclined configuration, is slightly above the transfer device 20.

The means that allow the portion to be inclined forward include an actuator member 34 fixed to a frame 36 supporting the conveyor belt 12 and having a sliding stem 38, the distal end 40 of which is articulated to an arm 42, which extends from the pivoted end 28 of the inclinable portion 26. The arm 42 may form an angle, for example, of between 60° and 85° with the longitudinal axis 14, and the stem 38 extends substantially transversely with respect to the arm 42.

The packaging line is also equipped with a central processing unit (CPU) 44 to control the operation of its various components in a desired manner.

In the operation of the packaging line just described, the conveyor belt 12 advances the rows 16 of products 10 to be packaged along the longitudinal axis 14 (see arrows 46 in FIG. 1). The distance between the various rows 16 and the number of products comprised in each row may be independently substantially any, and the line is able to manage this variability without any difficulty.

Figure 3:
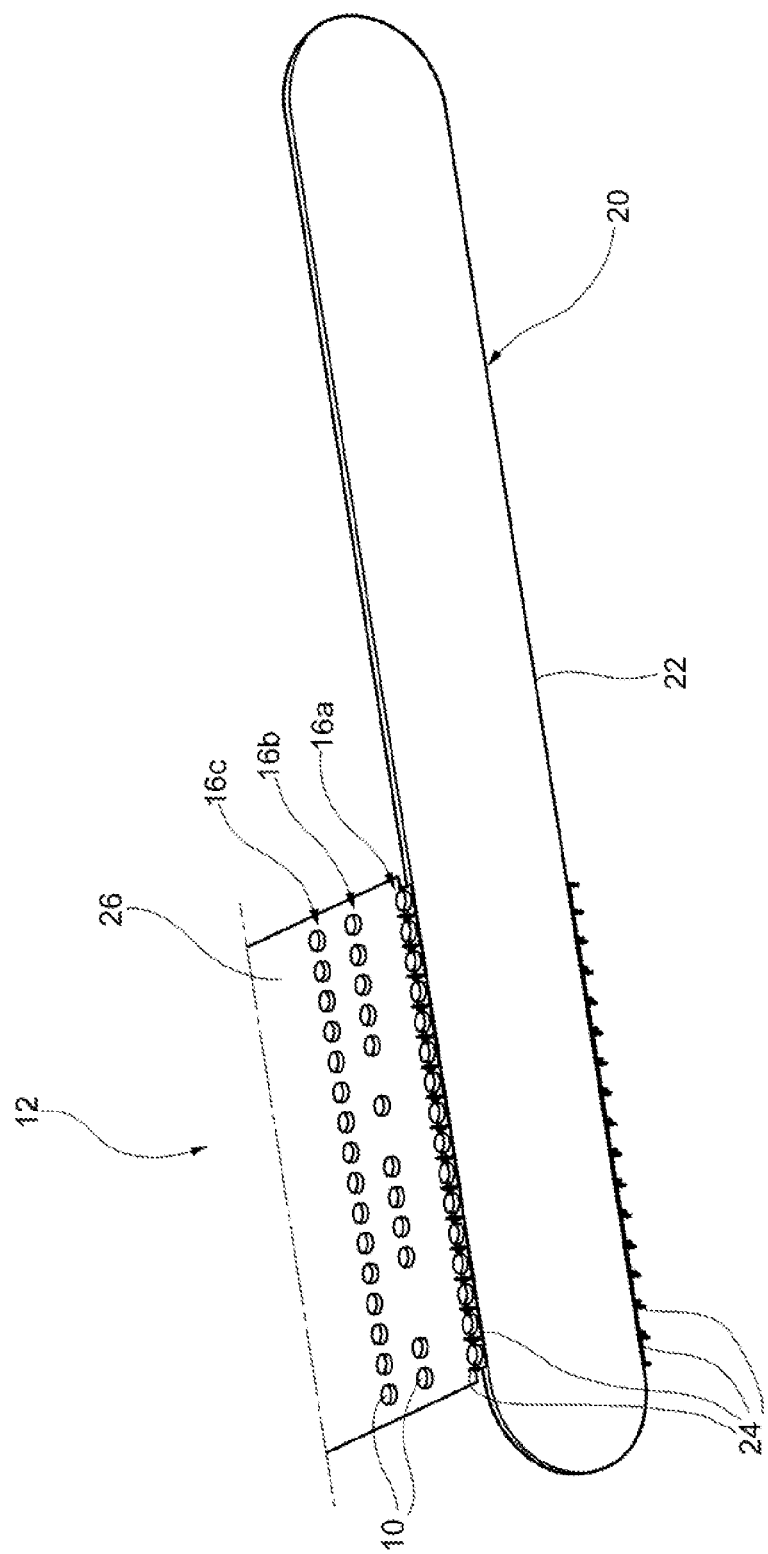
Figure 4:
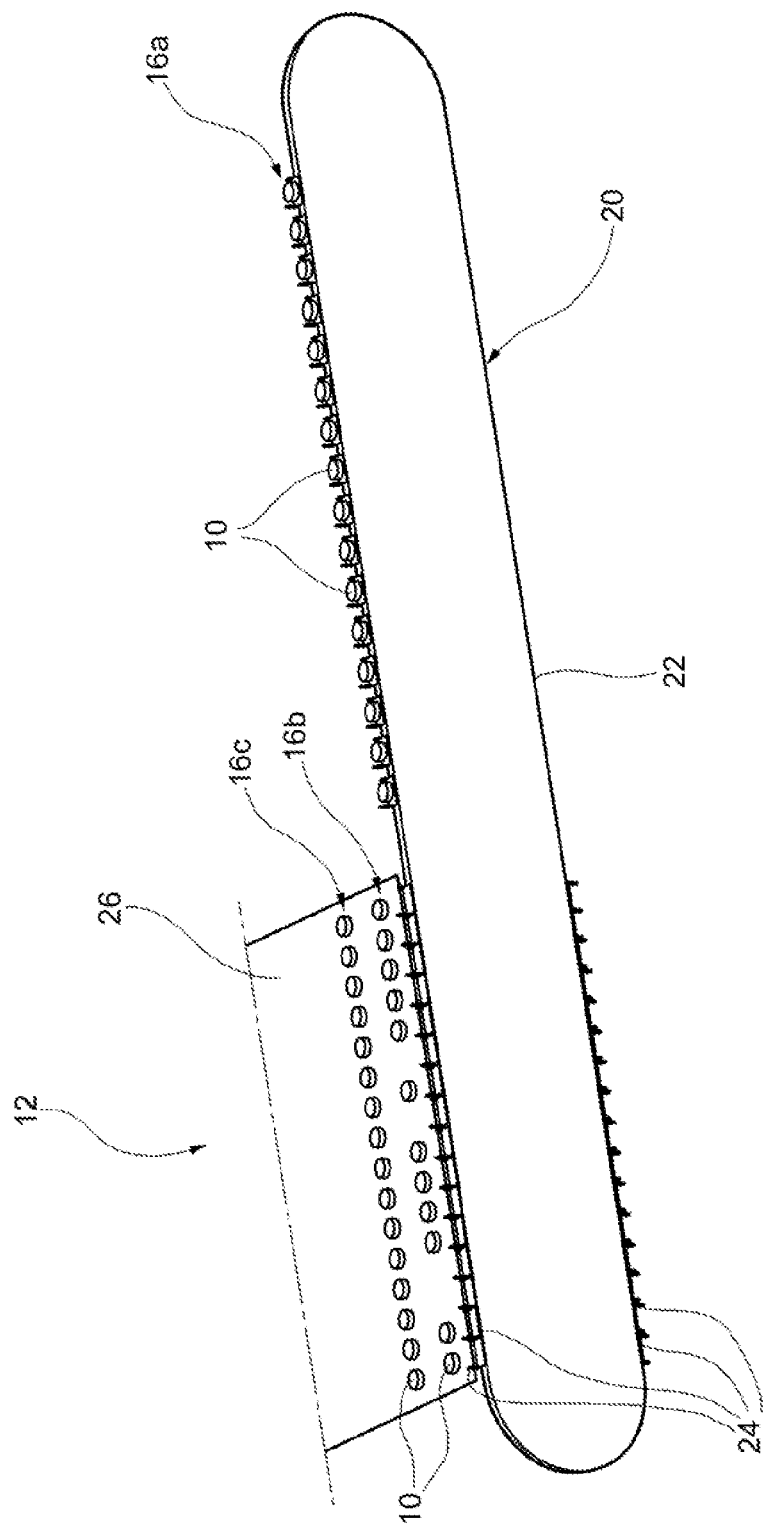
Figure 5:
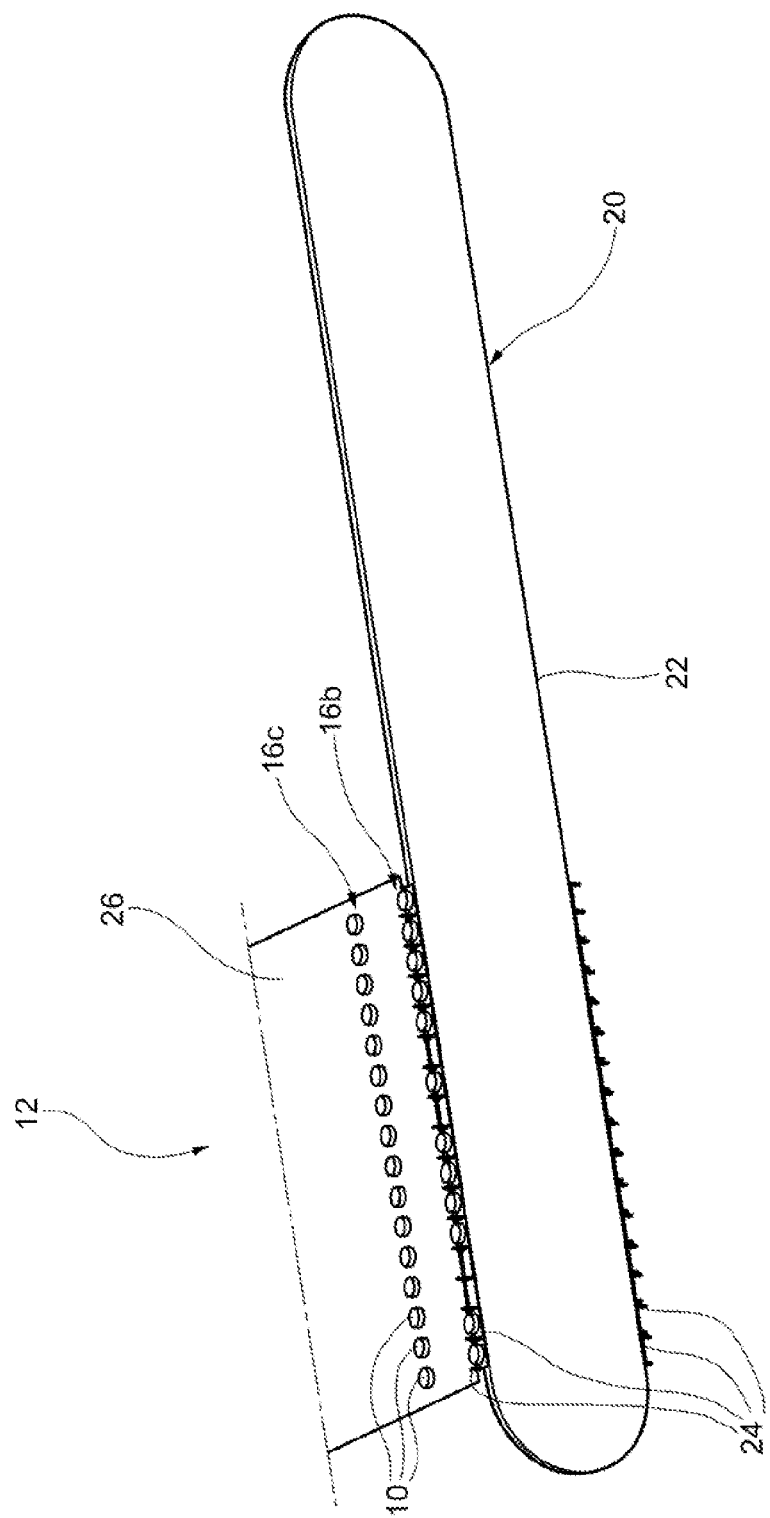
Figure 6:
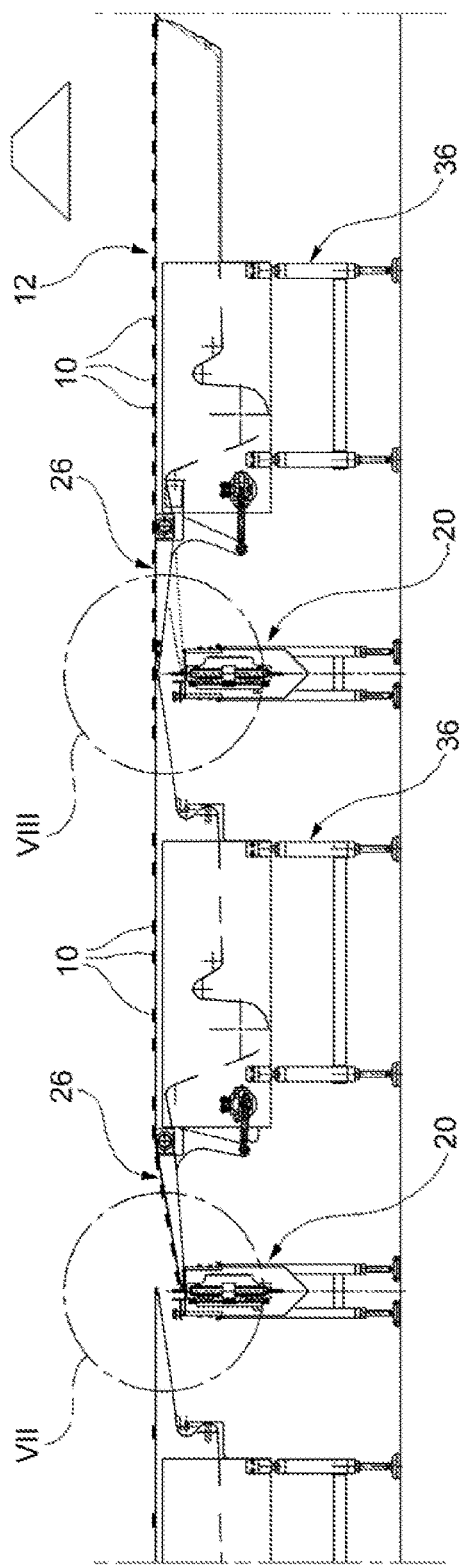
FIG. 6 is a front elevation view of a portion of the line of FIG. 1, and FIGS. 7 and 8 are enlarged scale views of respective details of FIG. 6.

In particular, when (see FIG. 2) a row 16a of products 10 is located at the end 32 of the inclinable portion 26 of the conveyor belt 12 next to the transfer device 20 of the packaging machine 18 wherein these products 10 are to be packaged, the stem 38 of the respective actuator member 34 retracts (see FIG. 7), causing the rotation of the arm 42 and the portion 26 with respect to the pivot axis 30. The portion 26 thus inclines forward, bringing its free end 32 adjacent to the transfer device 20, and (FIG. 3) the products 10 of the row 16a are unloaded onto respective movable conveyor units 24, which the CPU 44 has placed in appropriate number and position on the upper rectilinear length of the stator 22 of the linear motor. The linear motor then advances the products 10 which formed the row 16a towards the packaging machine 18 and, at the same time, the products 10 of the subsequent row 16b approach the transfer device 20 (FIG. 4). Also in this case, the products 10 of the row 16b are unloaded (FIG. 5) onto additional respective movable conveyor units 24 of the transfer device 20, which the CPU 44 has previously placed in an appropriate number and position on the upper rectilinear length of the stator 22 of the linear motor.

As a whole, therefore—as illustrated in FIG. 2-5—the CPU 44 is able to easily manage rows 16 formed by a different number of products 10 due to the flexibility ensured by the independence of the movable conveyor units 24 of the device 20.

Subsequently, the additional row 16c may be discharged onto the same transfer device 20 with methods similar to those previously described for the rows 16a and 16b, or the portion 26, which had previously been inclined, may be brought back flush with the surface of the belt conveyor 12 by advancing the stem 38 (see FIG. 8) of the actuator member 34. In this way, the row 16c gets over the aforesaid transfer device 20, and the relative products 10 may be discharged onto a transfer device 20 located further along the longitudinal axis 14 and sent to the respective packaging machine 18.

As a whole, each row 16 may therefore be fed to the packaging machine 18 at the ideal time, avoiding dead times and fully exploiting the potential of the individual components of the packaging line of the invention.

In variants that are not illustrated in the operating method just described, it is possible to load on each movable conveyor unit 24 a number of products 10 greater than one. In this case, after a first row of products 10 has been unloaded onto respective units 24, the latter are not immediately routed towards the packaging machine 18, but possibly only repositioned adjacent to the inclinable portion 26 of the conveyor belt 12 to receive the products 10 of a subsequent row, which are unloaded to the units 24 above those of the previous row. If desired, this process may be repeated several times to load the products 10 of further rows gradually fed by the conveyor belt 12 onto the units 24. Finally, when the desired number of products 10 has been loaded onto each unit 24, the units 24 are made to advance towards the packaging machine 18.

Naturally, without prejudice to the principle of the invention, the details of implementation and the embodiments may vary widely relative to that which has been described purely by way of example, without thereby departing from the scope of the invention as defined in the appended claims.

What is claimed is:

1. A packaging line for products, in particular food products, comprising:
    a conveyor belt having a longitudinal feed axis and carrying said products arranged in a plurality of rows orthogonal to said longitudinal feed axis,
    at least one packaging machine for said products, and
    at least one transfer device for transferring the products from the conveyor belt to said at least one packaging machine along a transverse direction with respect to the longitudinal feed axis, wherein the at least one transfer device comprises a linear motor including a closed-loop stator, and a plurality of conveyor units independently movable along the closed-loop stator and configured to receive at least one respective product,
    wherein said conveyor belt comprises at least one inclinable portion located immediately upstream of an intersection with said at least one transfer device and provided with means allowing forward inclination of the at least one inclinable portion, wherein said at least one inclinable portion comprises an end pivoted about a transverse axis and an opposite end which, in a non-inclined configuration, is above the at least one transfer device and, in a forwardly inclined configuration, is adjacent to the at least one transfer device, and wherein said means allowing forward inclination of the at least one inclinable portion include an actuator member attached to a frame supporting the conveyor belt and having a sliding stem, a distal end of the sliding stem being articulated to an arm extending from the end pivoted about the transverse axis.

2. The packaging line of claim 1, wherein said closed-loop stator comprises two rectilinear lengths parallel to each other in a vertical plane and joined at ends by two semicircular portions.

3. The packaging line of claim 1, wherein said packaging line is provided with a central processing unit (CPU).

4. The packaging line of claim 1, wherein said sliding stem extends transversely with respect to the arm.

5. The packaging line of claim 1, wherein said arm forms an angle ranging from 60° to 85° with said longitudinal feed axis.

6. The packaging line of claim 1, comprising a plurality of packaging machines each having a respective transfer device, and arranged longitudinally offset with respect to said conveyor belt.

7. The packaging line of claim 1, wherein said transverse direction is orthogonal to said longitudinal feed axis.

8. A method for packaging products, in particular food products, the method comprising using the packaging line of claim 1.

9. The method for packaging products of claim 8, wherein said products are arranged in a plurality of rows orthogonal with respect to a longitudinal feed axis of a conveyor belt and transferred from said conveyor belt to at least one packaging machine along a direction transverse to the longitudinal feed axis of the conveyor belt by at least one transfer device comprising a linear motor including a closed-loop stator, and a plurality of conveyor units independently movable along the closed-loop stator and configured to receive at least one respective product.

10. The method for packaging products of claim 9, wherein distances between the rows and the number of products comprised in each row are variable.

11. The method for packaging products of claim 9, wherein a number of products greater than one is loaded on each movable conveyor unit.

* * * * *